United States Patent [19]

Mos et al.

[11] Patent Number: 5,397,886
[45] Date of Patent: Mar. 14, 1995

[54] MAGNETIC STRIPE AND/OR MICRO CHIP CARD MOTORIZED READER/ENCODER MECHANISM

[75] Inventors: Robert J. Mos; Robert J. Mos, both of San Diego, Calif.; Rene F. Baus, Jr., New Iberia, La.

[73] Assignee: Mos Magnetics Corporation, San Diego, Calif.

[21] Appl. No.: 75,131

[22] Filed: Jun. 10, 1993

[51] Int. Cl.⁶ .......................................... G06K 13/00
[52] U.S. Cl. ................................... 235/475; 235/440
[58] Field of Search ............... 235/475, 441, 479, 480, 235/440

[56] References Cited

U.S. PATENT DOCUMENTS 5,099,111 3/1992 Takakura et al. ................. 235/441

Primary Examiner—Davis L. Willis
Assistant Examiner—Peter J. Rashid
Attorney, Agent, or Firm—Baker, Maxham, Jester & Meador

[57] ABSTRACT

A motorized card reader/encoder mechanism of novel design utilizes a positionable card handling system to perform card reading and/or encoding operations efficiently and with minimal space requirements. In a preferred configuration, the card mechanism includes a generally rotatable guide assembly having a card path for receiving and transporting a card for read/encode operations, and optionally, a generally fixed throat assembly for directing a card to the card guide assembly. The guide assembly is rotatable between a plurality of positions including a card transfer position wherein the guide assembly is in generally adjacent alignment with the throat assembly, a card read/encode position wherein the guide assembly is in a rotated position not in substantial alignment with the throat assembly, and a card retention position wherein the guide assembly card path is oriented generally vertically in order to transfer a card to a card capture bin. A single station drive system is provided for transporting a card without substantial jitter, and for rotating the guide assembly between the transfer position and the read/encode and card retention positions.

20 Claims, 7 Drawing Sheets

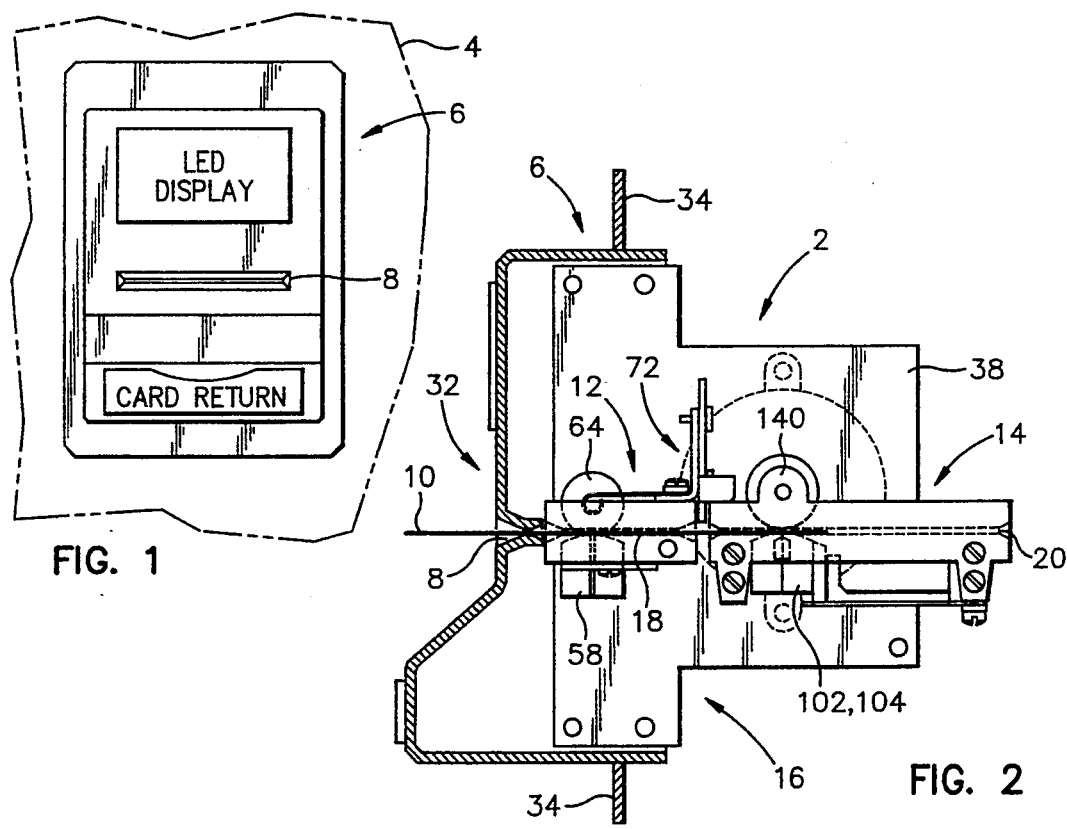
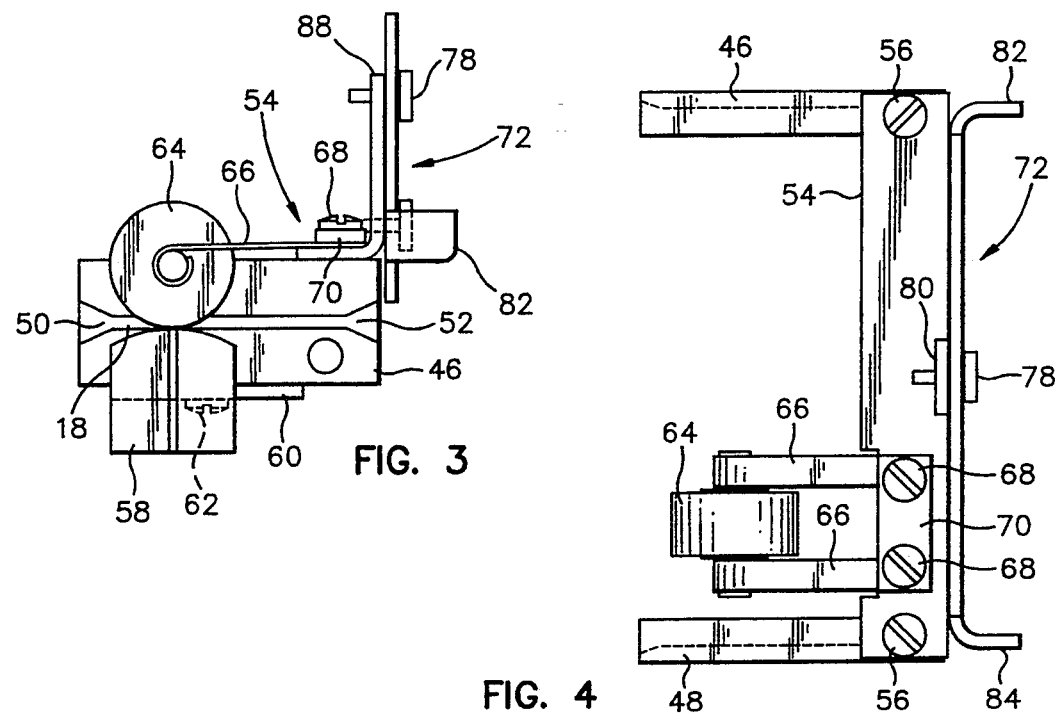

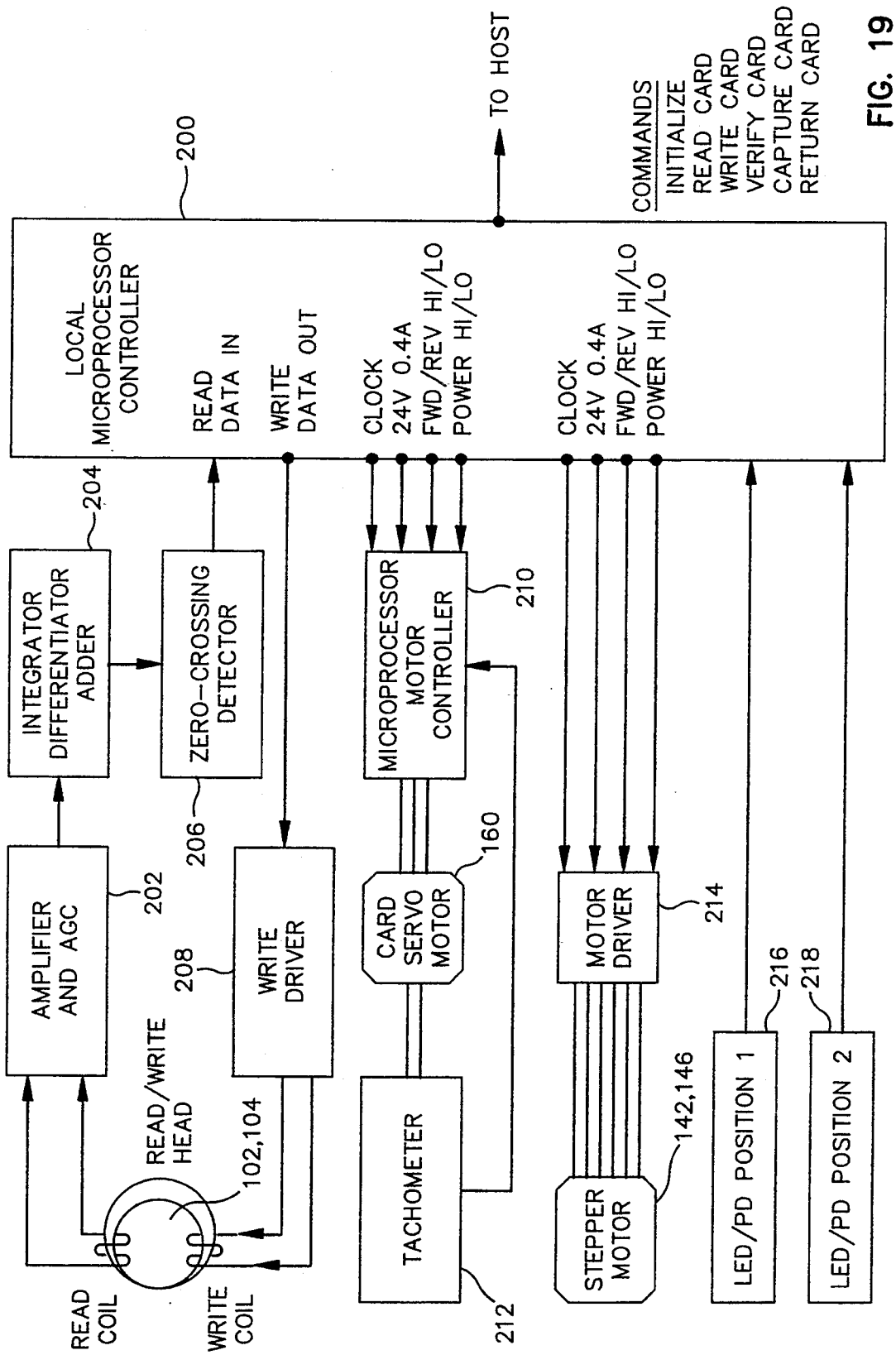

MAGNETIC STRIPE AND/OR MICRO CHIP CARD MOTORIZED READER/ENCODER MECHANISM

BACKGROUND OF THE INVENTION

The present invention is directed to apparatus for reading and/or encoding magnetic stripe and/or micro chip cards, including bank cards, credit cards, debit cards, identification cards and many others.

Automated teller machines (ATMs), gasoline pump stations and other apparatus designed to operate with magnetic stripe and/or micro chip cards utilize card handling mechanisms in order to perform data read/write operations. The majority of motorized card reader/encoders available today are similar in design and appear to be based on an original ATM design introduced in the late 1970's. Typically, such devices measure about seven to eight inches deep by three to four inches high by three to four inches wide behind the mounting plate of the apparatus in which they are installed. The throat, bezel, and entrance slot generally extend forwardly of the apparatus mounting plate approximately one and one-half inches.

Prior art card reader/encoders typically contain two drive stations (four rollers) which are driven by a constant speed servo motor that couples to the drive rollers through pulleys and belts. In the prior art systems, it is difficult to maintain a constant card transport velocity. The flexibility of the belts, as well as the variable friction imposed on the card by the guide slot, the magnetic heads, and the rollers that come into contact with the card, all contribute to instantaneous speed variations (ISVs). When ISVs occur during read/write operations, a phenomenon known as "jitter" results. Card jitter causes sudden, small, irregular departures from the phase, amplitude or pulse duration of a signal due to disruptions in the timing of or spatial variations between successive magnetic pulses, and often leads to read/write errors. To prevent jitter from being introduced into encoded data, prior art reader/encoders typically employ an optical or a magnetic encoder, driven by a rubber faced roller, that generates a clock signal for read/encode operations performed by a downstream magnetic head system. Because the clock signal controlling the read/encode operations varies with the speed of the card, jitter is reduced and the device is rendered less sensitive to ISVs.

A disadvantage of the prior art reader/encoders is the complexity of the drive train and the requirement for a clocking encoder which adds materially to the manufacturing cost of such devices. Moreover, clocking encoders are only marginally effective in overcoming jitter. Indeed, most credit cards in circulation do not meet ANSI or ISO jitter standards. A further disadvantage of the prior art systems is the necessity of having two rather than one drive station, which substantially increases drive train length.

The excessive length of the prior art optical encoders makes them too long to fit into the allotted space of many existing and proposed card reading apparatus. In today's market, magnetic stripe and/or micro chip cards are being used with increasing frequency in automated teller machines, point of sale terminals, bank teller stations, gasoline pump stations, vending machines, drivers license identification apparatus, telephone credit and debit card stations, security access equipment and check cashing identification devices. These applications demand reader/encoders that can be reduced in size without sacrificing functionality.

What is needed therefore is a motorized card reader/encoder for reading and encoding magnetic stripe cards and/or micro-chip cards such as bank cards, credit cards, identification cards, debit cards and the like in accordance with ANSI and ISO standards where applicable. Given the wide variety of anticipated applications, the reader/encoder should be capable of reading and encoding any combination of three tracks specified by ANSI and ISO standards at either 75 bpi or 210 bpi (bits-per inch). The reader/encoder should likewise be capable of reading and encoding debit cards containing two or more stripes. Provision should also be made for card capture in the event of a security breach. The reader/encoder device should be able to sense foreign objects and exclude them in order to prevent outside interference with the card during read/write operations. It would be further desirable to provide programming capability to accept only specific encoded cards. Debit card dispensing would be another desirable characteristic. Finally, the capability of reading a micro-chip card (smart card) in a stationary position should be available with minimal modification or redesign.

Each of the foregoing design objectives should be provided at the lowest possible cost, in the smallest possible configuration, with high reliability, low maintenance and ease of conversion for special applications.

SUMMARY OF THE INVENTION

In accordance with the foregoing objectives, a motorized card reader/encoder mechanism of novel design utilizes a positionable card handling system to perform card reading and/or encoding operations efficiently and with minimal space requirements. In preferred embodiments, the card mechanism includes a generally rotatable guide assembly providing a card path for receiving and transporting the card during read/encode operations, and optionally, a generally fixed throat assembly. The guide assembly is rotatable between a plurality of positions including card transfer position wherein the guide assembly is in generally adjacent alignment with the throat assembly, a card read/encode position wherein the guide assembly is in a rotated position not in substantial alignment with the throat assembly, and a card retention position. A single station drive system is provided for transporting a card without substantial jitter, and for rotating the guide assembly between the transfer position and the read/encode and card retention positions.

There is proposed, therefore, a card reader/encoder whose overall size, including the depth of the unit, is greatly reduced from that of prior art devices, and which does not require optical or magnetic encoders to provide jitter-free operation, yielding accurate data read/write operations without added cost or complexity. Additional advantages result from an ability to provide a reliable card capture system which would otherwise be difficult to achieve.

BRIEF DESCRIPTION OF THE DRAWINGS

The objects, advantages and features of the present invention will be more clearly understood by reference to the following detailed disclosure and the accompanying drawing in which:

FIG. 1 is a front elevational view of the bezel of a typical card-activatable apparatus in which the card mechanism of the present invention could be incorporated;

FIG. 2 is a side elevational view of a card mechanism constructed in accordance with a first aspect of the present invention including stepper motor drive components, showing the mechanism in a card transfer position;

FIG. 3 is a partial side view of a throat assembly of the card mechanism of FIG. 2;

FIG. 4 is a plan view of the throat assembly of FIG. 3;

FIG. 19 is a block diagram showing the operation of a sensor system and drive control system of a card mechanism constructed in accordance with the present invention.

DETAILED DESCRIPTION OF THE PREFERRED EMBODIMENTS

Figure 5:
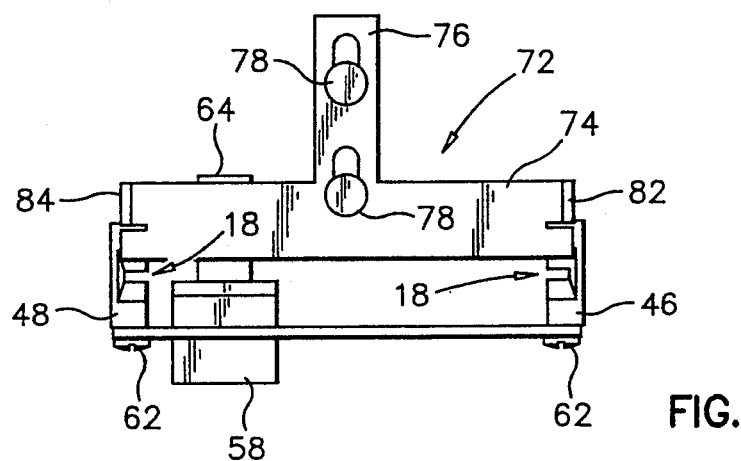
FIG. 5 is a rear view of the throat assembly of FIG. 3.

Referring now to FIGS. 1 and 2, a magnetic stripe card reading/encoding mechanism 2 is installed in a conventional magnetic stripe card-activatable apparatus 4 which may be an ATM, a gasoline pump station or any other card reading and/or encoding device. A bezel 6 is mounted to the apparatus 4 and supports the card mechanism 2 as well as other components such as an LED (light emitting diode) text display, a card return switch and perhaps other equipment (not shown) providing transactional functionality to a customer or other user. The bezel 6 includes a generally horizontal slot 8 forming an opening for inserting a card 10 into the apparatus 4.

Behind, or as part of the slot 8, the card mechanism 2 optionally includes a throat assembly 12 to receive the card 10 from the slot 8. Positioned behind the throat assembly 12 (or the slot 8 if the throat assembly is not used) in adjacent relationship therewith is a card guide assembly 14. Both the throat assembly 12 and the card guide assembly 14 are mounted to a card mechanism support frame or chassis 16, which is itself attached to the bezel 6. As described in more detail hereinafter, the throat assembly 12 is fixedly mounted to the support chassis 16 while the card guide assembly 14 is rotatably mounted to the support chassis. The throat assembly 12 and the card guide assembly 14 each include a card guide, 18 and 20, respectively, which can be oriented in adjacent mutual alignment by directing the card guide assembly to one rotational position. Alternatively, the card guides 18 and 20 can be positioned into substantial nonalignment by rotating the card guide assembly to another rotational position, as shown, for example, in FIGS. 12 and 13.

Figure 11:
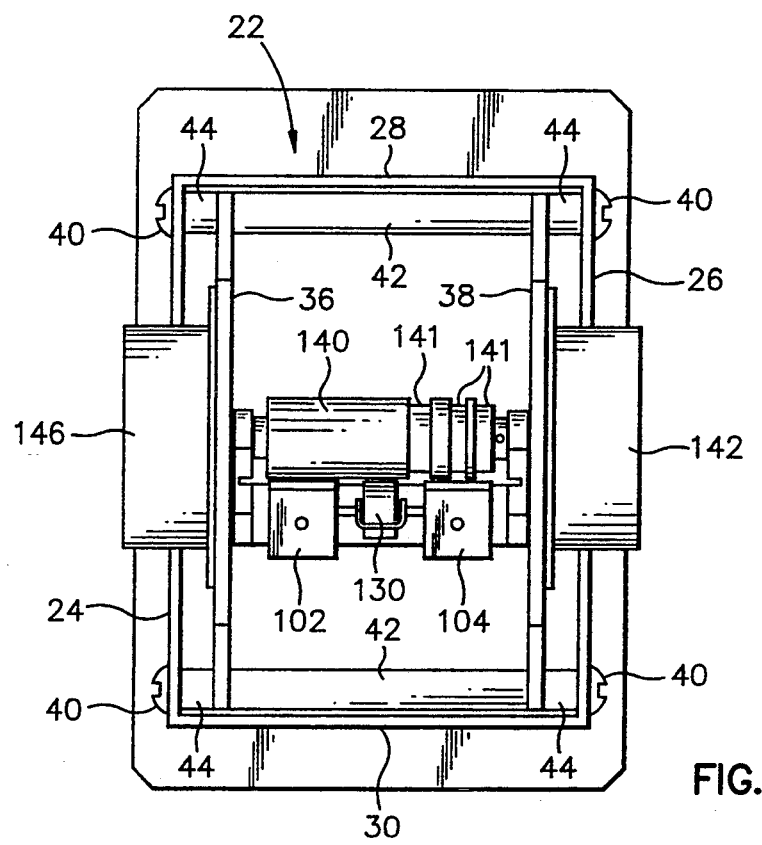
FIG. 11 is a rear view of the card mechanism of FIG. 2.

Referring now to FIGS. 2 and 11, the bezel 6 can be constructed using a multitude of design configurations but is shown by way of example as including a box-like support frame structure 22 formed from a pair of side plates 24 and 26, a top plate 28 and a bottom plate 30. The bezel 6 further includes a front face 32 and a continuous peripheral mounting flange 34 extending outwardly from the support frame structure 22. The mounting flange 34 can be mounted to the card-activatable apparatus 4 by any suitable attachment arrangement (not shown), but such attachment is preferably readily disengageable to facilitate removal of the card mechanism 2 from the apparatus 4 for servicing and/or replacement.

The support chassis 16 mounts to the frame structure 22 of the bezel 6. The chassis 16 includes a pair of generally T-shaped mounting plates 36 and 38. The mounting plates 36 and 38 are attached to the frame structure 22 using threaded fasteners 40. A spacer sleeve 42 is provided between the mounting plates 36 and 38 and locked between the mounting plates by appropriate fasteners (not shown). Spacer sleeves 44 are positioned to engage the fasteners 40 and provide a secure attachment configuration between the frame structure 22 and the mounting plates 36 and 38.

Referring now to FIGS. 2–5, the card guide path 18 of the throat assembly 12 is formed by a pair of slotted guide members 46 and 48, which are fixedly mounted by appropriate fastening members to the chassis mounting plates 36 and 38. The guide members 46 and 48 forming card guide 18 define a card path that is of generally linear configuration and which has a first end 50 and a second end 52. Preferably, the distance between the vertical walls of the guide slots is slightly greater than a typical card width of 2.125 inches ± 0.002. Extending between the guide members 46 and 48 is a cross bar member 54, which is mounted to the guide members using conventional fasteners 56.

The throat assembly 12 is positioned to receive the card 10 from the horizontal bezel slot 8 and transfer it to the card guide assembly 14. To that end, the throat assembly 12 includes a card sensor 58 mounted between the slotted guide members 46 and 48, preferably at an off-center location corresponding to the typical location of a magnetic stripe on the card 10. A cross bar member 60 is used to attach the sensor 58 to the guide members 46 and 48. The cross bar member 60 is mounted to the guide members using appropriate fasteners 62.

Positioned in opposing relation to the card sensor 58 is an idler wheel 64. The idler wheel 64 is mounted to the cross bar member 54 via a pair of spring loaded biasing arms 66 attached to the cross bar member 54 using conventional fasteners 68 and a cover plate 70. Thus, the card 10 is assured of positively engaging the card sensor 58 while in the card guide 18.

As discussed in more detail hereinafter, the card sensor 58 generates a signal in response to the presence of the card 10 in the card guide 18, which signal enables the card to gain access to the card guide assembly 14 for reading and/or encoding operations. To further control the movement of the card 10 in the card mechanism 2, the card guide assembly is provided with an access control gate 72. The control gate 72 includes a generally horizontal shutter 74 having a central slotted leg 76. The slotted leg 76 is mounted by appropriate fasteners 78 to a central upright leg 80 of the cross bar member 54. The shutter 74 is slideably positionable between a raised position (shown in FIG. 5) and a lowered position (not shown) wherein the shutter 74 blocks the throat assembly guide 18 to prevent the card 10 from passing the gate 72. The shutter 74 further includes a pair of lateral flanges 82 and 84 which are configured for engagement with the card guide assembly 14, in order to raise and lower the shutter 74. A spring (not shown) may be optionally provided to ensure that the shutter is positively biased to the lowered position when not engaged by the card guide assembly 14.

Turning now to FIGS. 2 and 6–10, the card guide assembly 14 is seen as including a pair of slotted guide members 86 and 88 forming the card guide 20. The card guide 20 defines a generally linear card path and includes a forward end 90 and a rearward end 92. The guide members 86 and 88 are laterally joined together by a pair of forward and rearward cross bar members 94 and 96 of generally rectangular cross-section using conventional fasteners 97. More specifically, the guide members 86 and 88 each include cross bar mounting lugs 98 and 100 which extend downwardly from the guide slots and mount to the cross bar members 94 and 96. Extending forwardly from the rearward cross bar member 96 are a pair of read/write sensors 102 and 104 that are positioned to perform reading and encoding operations on the conventionally arranged magnetic stripes of the card 10. Although two read/write sensors are shown, most applications for cards having a single magnetic stripe would require only one sensor.

Figure 7:
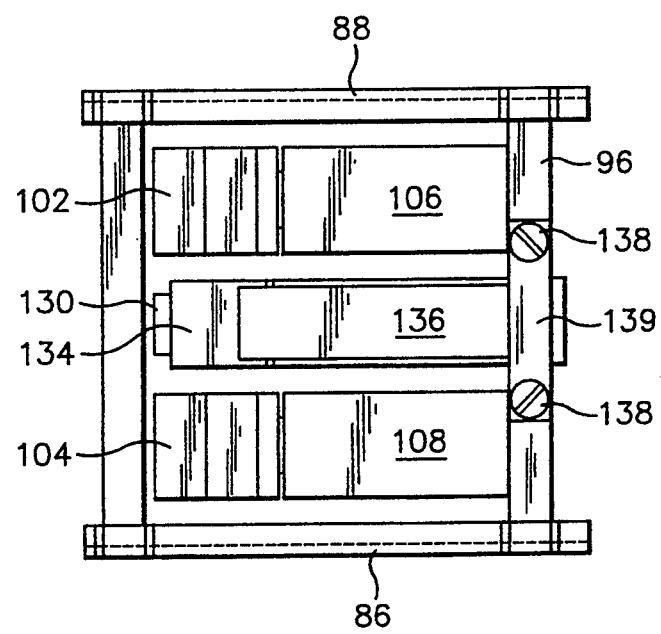
FIG. 7 is a plan view of the card guide assembly of FIG. 6.
Figure 8:
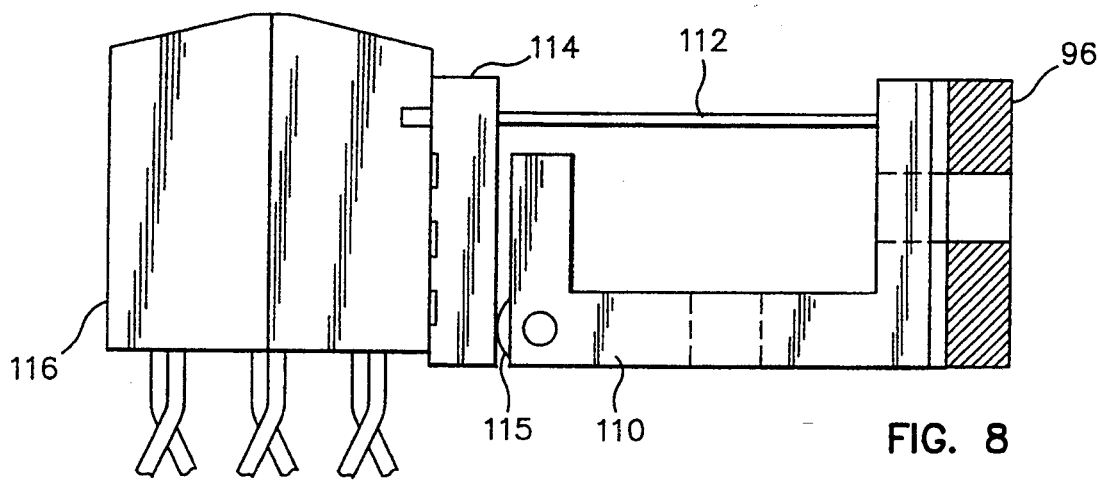
FIG. 8 is a side view of a magnetic head spring mount assembly.
Figure 9:
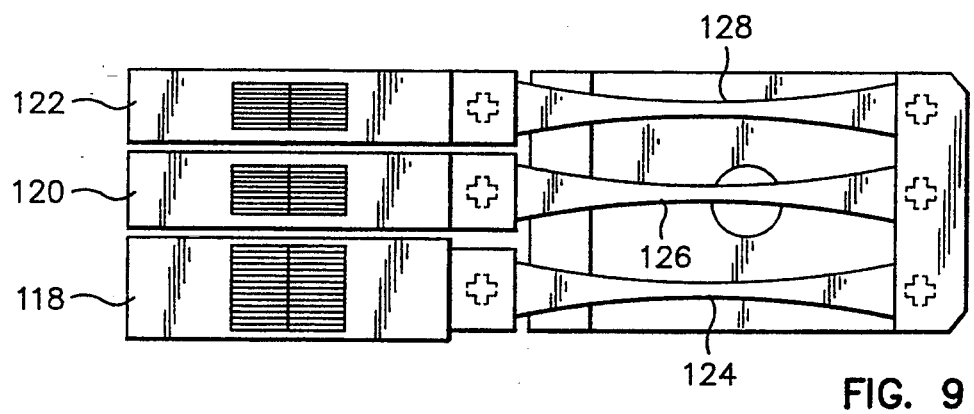
FIG. 9 is a top view of the magnetic head spring mount assembly of FIG. 8.

As shown in FIG. 7, the sensors 102 and 104 are mounted to the rear cross bar member 96 via a pair of spring mount assemblies 106 and 108 which are shown in greater detail in FIGS. 8 and 9. By way of example, the spring mount assembly 106 includes a support fitting 110 that is rearwardly mounted to the cross bar member 96. Cantilevered forwardly from the base of the fitting 110 is a spring system 112 made from spring steel or the like that attaches at its forward end to one or more head mounts 114 and one or more magnetic heads 116. Smooth upward and downward movement of the head mount(s) 114 is provided by one or more rollers 115 mounted on the support fitting 110. As shown in FIG. 9, the sensors 102 and 104 may include three separate magnetic heads 118, 120 and 122 that are biased by the cantilever springs 124, 126 and 126, respectively, toward the card guide 20 in an upward direction. Advantageously, the narrow central portion of the springs 124, 126 and 128 facilitates the gimballing of the heads 118, 120 and 122 in order to compensate for card warpage.

Figure 6:
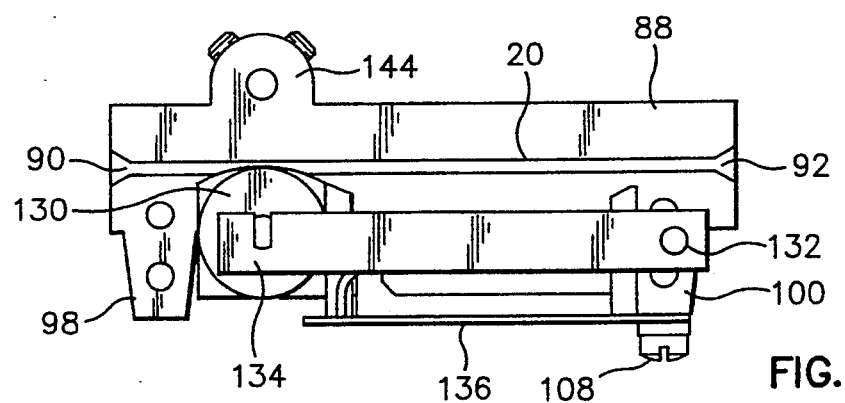
FIG. 6 is a partial side view of a card guide assembly of the card mechanism of FIG. 2.

Positioned between the sensors 102 and 104 is an idler wheel 130 supported on an idler arm 132 that is pivotally mounted to the rearward cross bar member 96, as shown in FIG. 7. This pivotal connection is provided by a pin 134 of conventional design, as shown in FIG. 6. Positioned below the idler arm 132 is an idler spring 136 that serves to bias the idler wheel 130 upwardly toward the card guide 20. The idler spring 136 is mounted to the cross bar member 96 using conventional fasteners 138 and a cover plate 139.

Figure 10:
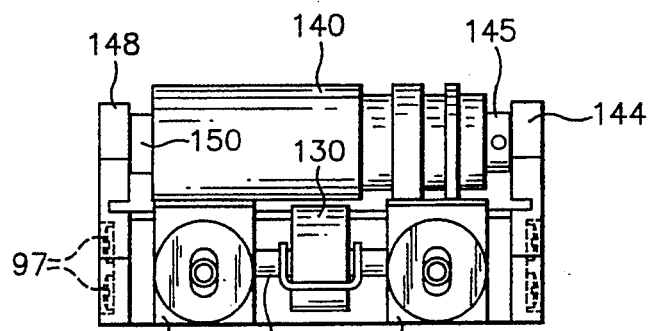
FIG. 10 is a rear view of the card guide assembly of FIG. 6.

The card guide assembly 14 is provided with a card drive system that transports the card 10 while it is positioned in the card guide 20. Referring now to FIGS. 10 and 11, this drive system includes a drive roller 140 made from thin (low compliance) rubber and which is preferably the same or substantially the same width as the card 10. Optionally, the drive roller 140 may be provided with one or more character relief areas 141, for example 0.015 inch deep notches, to provide clearance in areas of the card 10 where embossed characters are found. The character relief areas 141 serve to eliminate jitter which might otherwise occur should the roller 140 contact the embossed characters. The drive roller 140 is mounted to the drive shaft of a stepper motor 142. The stepper motor 142 is in turn mounted to the chassis mounting plate 38 and its shaft extends through an aperture in an ear 144 (FIG. 6) of the guide member 88. The drive roller 140 is secured to the drive shaft of the motor 142 via a collar 145 of conventional design.

The card guide assembly 14 is further provided with a card guide positioning drive system that rotatably positions the card guide assembly for read/write operations. The card guide positioning drive system includes a stepper motor 146 that is mounted to the chassis mounting plate 36. The stepper motor 146 has a drive shaft that extends through an aperture in an ear 148 of the guide member 86, through a spacer 150, and into sliding engagement with the drive roller 140. The stepper motor 146 is rotatably engaged with the guide member 86 using conventional set screws to secure the guide member ear 148 to the stepper motor drive shaft. Other shaft engagement arrangements could also be used.

Figure 12:
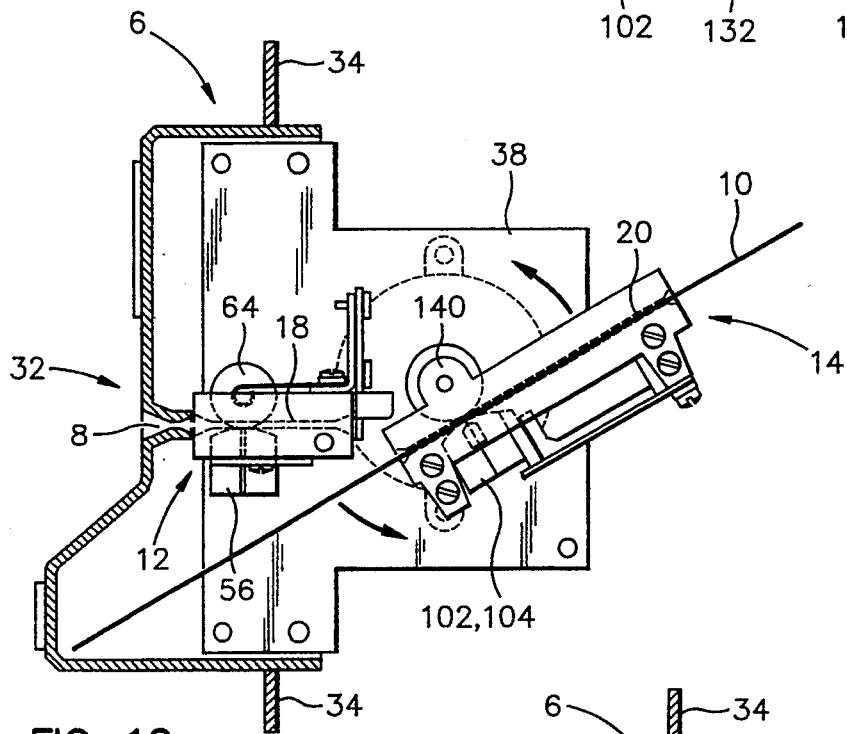
FIG. 12 is a side elevational view of the card mechanism of FIG. 2 showing the mechanism in card read/encode position.
Figure 13:
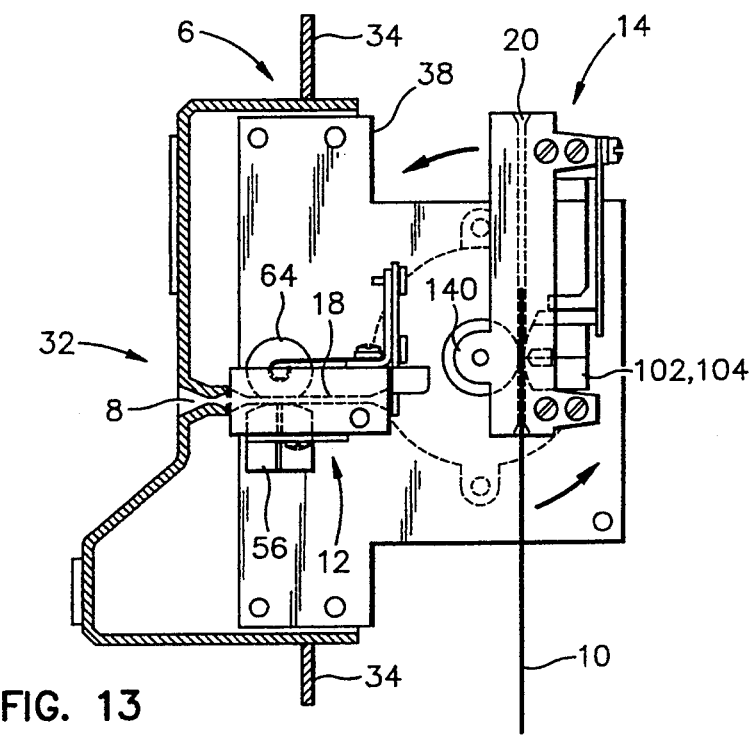
FIG. 13 is a side elevational view of the card mechanism of FIG. 2 showing the mechanism in a card retention position.

As the stepper motor 146 rotates, it causes the entire card guide assembly 14 to rotate with it about the common, mutually aligned axis defined by the two stepper motor shafts, which is the axis about which the drive roller 140 also rotates. This rotation is illustrated in FIGS. 2, 12 and 13. FIG. 2 illustrates a card access position wherein the guides 18 and 20 of the throat assembly 12 and card guide assembly 14 are in adjacent mutual alignment, and in alignment with the slot 8. This position allows the card 10 to be transferred between the throat and card guide assemblies. FIG. 12 illustrates a card read/encode position wherein the guide 20 of the card guide assembly is pivoted substantially out of alignment with the guide 18 of the throat assembly 12 and wherein card reading and/or encoding may be performed within a limited spatial envelope. In this rotation position, the stepper motor 142 can be activated to transport the card 10 past the sensors 102 and 104 as many times as desired to complete one or more read and/or write operations. FIG. 13 illustrates a card retention position in which the card is not returned to the customer and is retained for security purposes.

The card mechanism 2 is provided with appropriate control system components, described in more detail hereinafter, to direct the card mechanism through a complete card transaction sequence. In accordance with the control system provided, the card guide assembly is positioned during periods of quiescence in the manner shown in FIG. 12, such that the card gate 72 is closed and the card 10 cannot be inserted in the card guide assembly 14. When a card reading/encoding operation is desired, the user inserts the card 10 into the slot 8 and throat assembly guide 18 until the card gate sensor 56 senses flux transitions on the card. This results in an electrical signal being sent to the stepper motor 146, which causes the rotatable card guide assembly 14 to move into position to accept the card. As the card guide assembly 14 moves to the card transfer position, it engages and lifts the shutter 74, thereby allowing the card 10 to enter through the card gate 72 into the guide 20. If a foreign object (i.e., anything lacking an encoded magnetic stripe is inserted into the throat assembly 12, the shutter 74 remains in position to block its entry. Electronic control logic may be provided to ensure that, for example, five or more flux reversals of the proper form are sensed before the gate opening signal is sent to the stepper motor 146.

Simultaneously with the opening of the control gate 72, the card transport drive motor 142 is activated, awaiting the arrival of the card 10. As the user continues to push the card 10 into the card mechanism 2, the card enters the forward end 90 of the card guide 20. Shortly thereafter, the card 10 engages the rotating drive wheel 140 and is pulled between the drive wheel and the opposing idler wheel 130, and through the card guide 20 to its rearward end 92. When the trailing edge of the card 10 is sensed (preferably by a light emitting diode/photo collector pair, not shown), the card guide assembly stepper motor 146 is actuated to rotate the card guide assembly 14 to its read/encode position, thereby closing the control gate 72. As the card 10 passes the read/encode sensors 102 and 104, the sensors read the magnetic data encoded on the card tracks and store the data for transmission to a host computer. After the card 10 is read and its data is verified, the host computer can perform any number of desired transactions such as re-reading the card, writing new data to the card, capturing the card or returning it to its owner.

Card capture occurs when the host computer detects an abnormality in the transaction. For security reasons, the card guide drive motor 146 is activated to rotate the card guide assembly to the card retention position. In that position, the card guide 20 is preferably oriented vertically or near vertically. The card transport drive motor 142 is then activated and the card 10 is dispensed, with gravity assistance, from the forward end 90 of the guide 20 into a card retrieval bin (not shown).

To return the card 10 to its owner following a normal read/encode operation, the card transport drive motor 142 is activated with the card guide assembly in the position of FIG. 12, and the card 10 is directed to a card return area that is accessible to the user. Alternatively, the card guide assembly 14 may be returned to the position shown in FIG. 2 and the card 10 returned through the throat assembly 12.

In the above-described embodiment, both of the drive motors 142 and 146 are stepper motors. Advantageously, both motors are positioned so that their drive shafts are coaxial. This permits the use of other kinds of motors with minimal structural modification. For example, some card read/encode applications may require that a servo motor be used to transport the card 10 in the card guide assembly 14. Servo motors can accurately control the movement of the card 10 and thus may be required in applications were jitter must be held to an absolute minimum, for example, when it is desired to read the card's "magnetic signature" as a means of fraud prevention.

FIGS. 14–17 illustrate a second embodiment of the invention which is similar in virtually all respects to the embodiment described above except that a low cogging servo motor 160 is used as the card transport drive instead of the stepper motor 142. The servo motor 160 is mounted to the chassis mounting plate 38 so that its drive shaft is not coaxially aligned with that of the stepper motor 146 or the drive roller 140. Instead, the servo motor 160 connects to the drive roller 140 via a pulley 162 and belt 164 arrangement. The pulley 162 is mounted on the shaft supporting the drive roller 140. A tensioning roller 166 is provided to maintain proper torque on the drive roller 140. It is also desirable in this embodiment to provide a pair of card limiter springs 168 and 170. These are advantageous when a servo motor card transport drive is used to ensure that card movement is properly limited. Accordingly, the card mechanism 2 can be rapidly modified to accommodate either the stepper motor 142 or the servo motor 162 without affecting other components.

Figure 18:
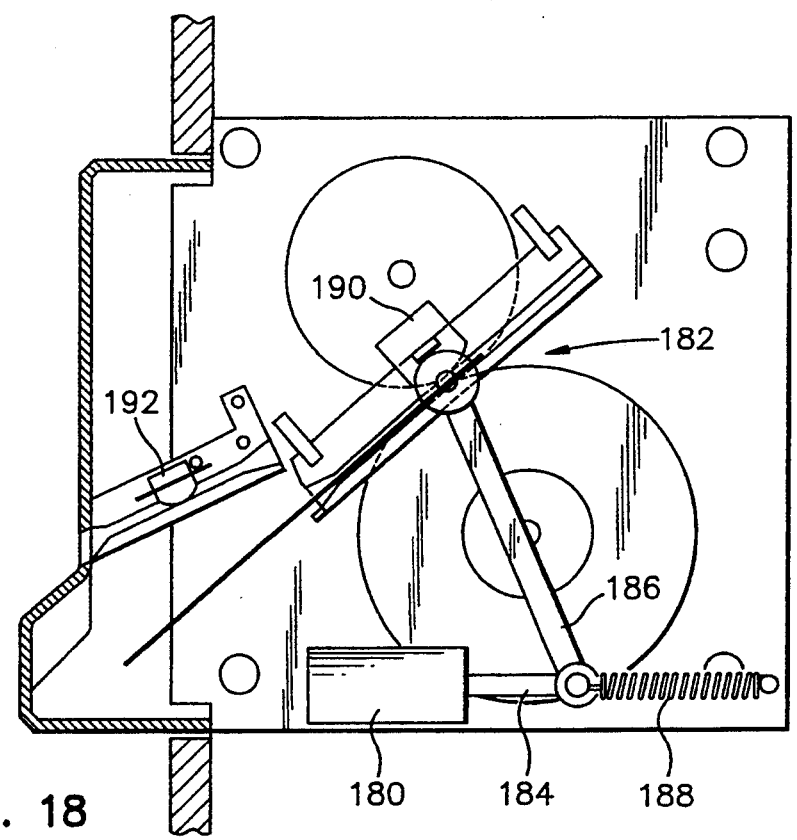
FIG. 18 is a side elevational view of a card mechanism constructed in accordance with a third aspect of the present invention including solenoid and stepper motor drive components.

A third embodiment of the invention is shown in FIG. 18. In this embodiment, the card guide assembly drive motor 146 has been replaced with a solenoid 180 connected to a modified card guide assembly 172 via a linkage formed from the solenoid plunger 184, a link member 186, and a spring 188. This embodiment further illustrates that magnetic sensors 190 and 192 may be positioned above a card if desired.

Figure 14:
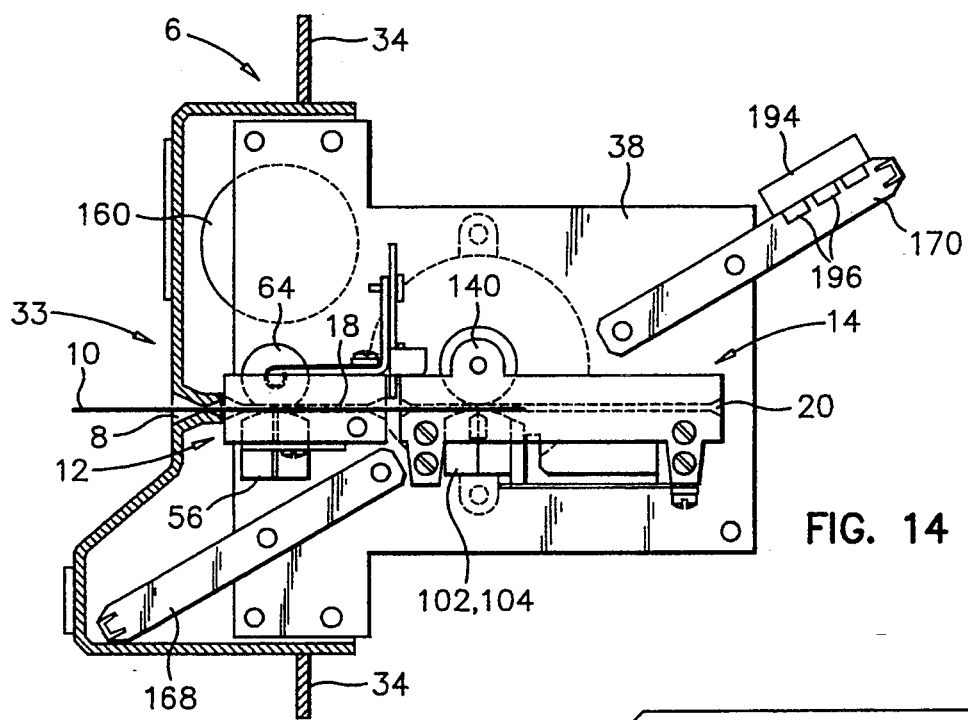
FIG. 14 is a side elevational view of a card mechanism constructed in accordance with a second aspect of the present invention including stepper motor and servo motor drive components.
Figure 15:
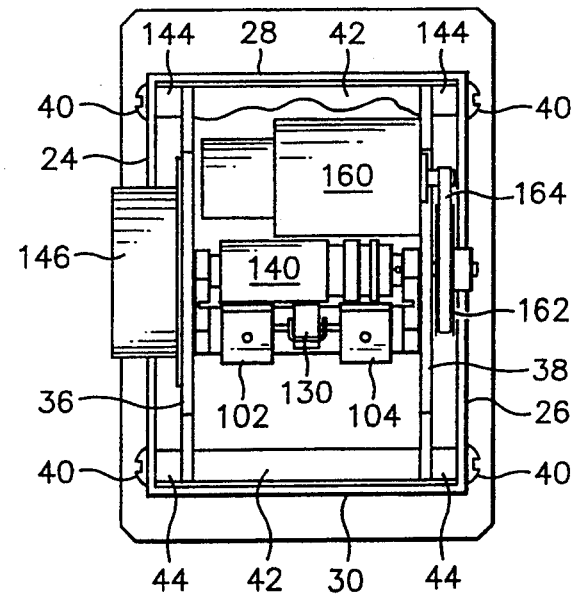
FIG. 15 is a rear view of the card mechanism of FIG. 14.
Figure 16:
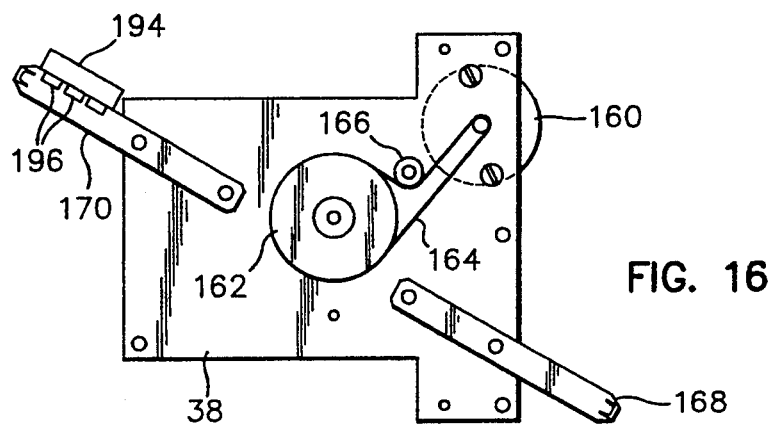
FIG. 16 is a partial side view of a card guide assembly of the card mechanism of FIG. 14.
Figure 17:
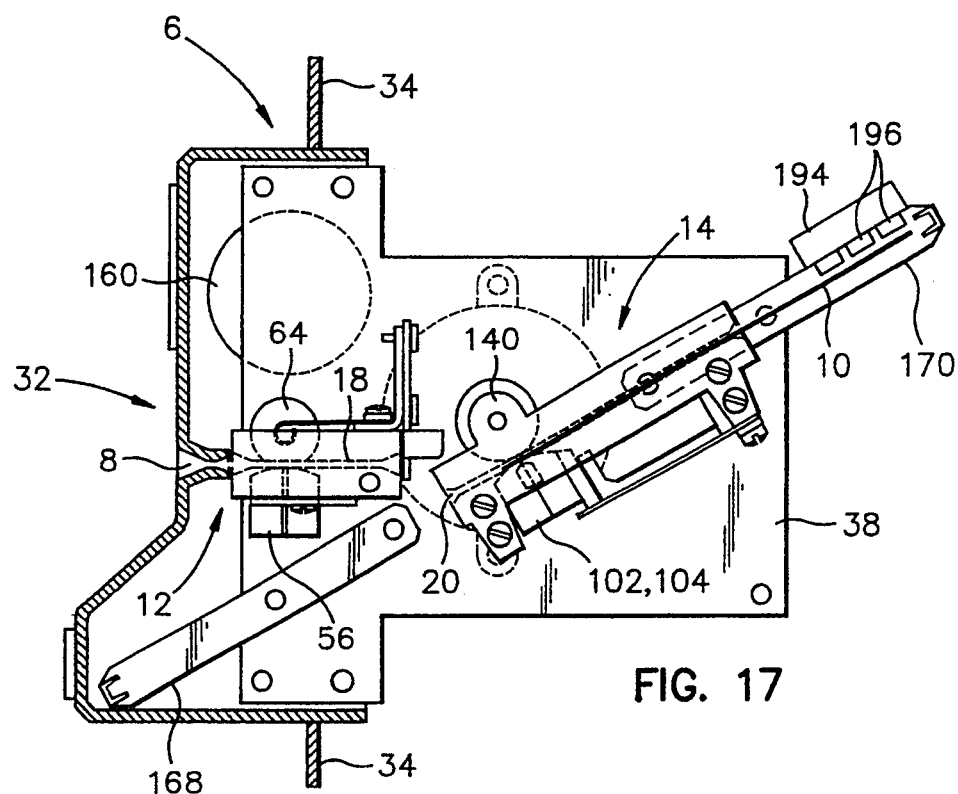
FIG. 17 is a another partial side view of the card guide assembly of FIG. 16.

It will be further appreciated that the card mechanism 2 could be easily adapted for micro chip cards. In that case, the mechanism would be augmented with contact sensors configured to electrically engage the card micro chip to establish communication between the micro chip and a host computer. Although contact sensors could be positioned in many locations in order to read a micro chip card, one approach would be to place a micro chip contact sensor unit 194 on one of the card limiter springs 168 or 170, as shown in FIGS. 14 and 16. The contact sensor unit 194 would include one or more spring loaded contact sensors 196 (typically eight) that engage corresponding contact points on the micro chip card. It will be appreciated that the card limiter springs 168 and/or 170 could also be used in the card mechanism of FIG. 2, having a stepper motor drive.

Referring now to FIG. 19, a control system for directing the operation of the card mechanism 2 is shown as including a local processor controller 200 which may include any number of conventionally available microprocessor devices having data input and output capability, a clock signal generator, appropriate logic circuitry, and a programmable central processing unit. The local processor 200 receives data input from the sensors 102 and/or 104 in a read mode via an amplifier and accumulator unit 202, an integrator/differentiator/adder unit 204, and a zero-crossing detector unit 206, all of conventional design. The local microprocessor controller 200 writes data to the sensors 102 and/or 104 via a conventional write drive unit 208. When a servo motor is used to transport a card in the card guide assembly 14, appropriate clock, power and directional control signals are provided to the servo motor 160 via a microprocessor motor controller unit 210 of conventional design, with appropriate motor speed feedback information being directed to the microprocessor motor controller 210 via a tachometer 212. Control of the stepper motors 142 and 146 is provided by appropriate clock, power and control signals generated by the local microprocessor controller 200 via a conventional motor driver unit 214. The local microprocessor controller 200 also receives inputs from one or more LED/PD devices 216 and 218 which, as described above, can be used to monitor the passage of the card 10 through various portions of the guides 18 and 20. Output from the local microprocessor controller is directed to a host computer via an interface bus (not shown) capable of carrying control signals and data that is read from and written to the card 10.

Accordingly, a novel magnetic stripe and/or micro chip card motorized reader/encoder mechanism has been described. The card mechanism has the advantages of low cost, small size, high reliability, low maintenance and ease of configuration conversion for special applications. With respect to sizing, it is submitted that the envelope volume of the card mechanism can be reduced from approximately 98 cubic inches, as found in prior art devices, to about 50 cubic inches or less. More importantly, the forward/rearward depth can be reduced from approximately 7.5 inches, as found in the prior art, to less than about 4.5 inches. The prior art use of optical and magnetic encoders has been eliminated and there is but one drive station which effectively overcomes the jitter problem found in prior art designs.

The following considerations illustrate the magnitude of the jitter problem. ANSI and ISO require that jitter in a 75 bpi track be less than five percent of the distance between two adjacent flux reversals which are separated by a nominal distance of 1/150=0.00066 inch. In a 210 bpi track, nine percent of 1/420=0.00238 inch is allowed. Five percent of 0.00066 is 333 micro inch; nine percent of 0.00238 is 214 micro inch. To achieve these jitter values with reliability, a product designer should aim for a two percent inherent jitter contribution from the drive system—electronic noise and card defects should be included in the jitter budget. This means that the drive system must contribute no more 86 micro inches to jitter.

To provide uniform velocity during the write operations, the drive systems described above can be provided with an advantageous combination of features. The card can be driven directly by a stepper motor through a drive roller which has a thin (low compliance) rubber face, i.e., no belts or gears. Alternatively, the stepper motor can be replaced with a low cogging servo motor for even greater control. Advantageously, card drive stepper motors are available having over 22 oz-in of potential driving torque against an estimated nominal frictional torque of 3.3 oz-in induced principally by the head-media contact. The head assembly can be provided with three heads, each individually mounted on its own spring and constrained to move perpendicularly to the card face without rotation about the gap line. Thus, the frictional force will remain constant independent of warpage in the card. By the use of a single drive roller station, a single head station, and a rotatable card holder guide, the card can be transported uniformly without acceleration during the write operation, i.e., the card does not come in contact with any objects such as additional heads or rollers that would disrupt its motion. Uniform angular velocity of the stepper motor can be achieved by driving it with sine waves of equal amplitude, having a phase difference of 90 degrees.

While various embodiments of a magnetic stripe and/or micro chip card motorized reader/encoder mechanism have been disclosed, it should be apparent that many variations and alternative embodiments will occur to those skilled in the art in view of the teachings herein. It is understood, therefore, that the invention is not to be in any way limited except in accordance with the spirit of the appended claims and their equivalents.

We claim:

1. A magnetic stripe and/or micro chip card motorized reader/encoder mechanism, comprising:
   a support chassis;
   a card guide assembly rotatably mounted on said support chassis;
   a throat assembly positioned adjacent said card guide assembly for receiving a card and directing it toward said card guide assembly;
   a first drive system operatively connected to rotate said card guide assembly relative to said support chassis between a card access position and a card read/encode position;
   a second drive system operatively connected to transport a card in said card guide assembly; and
   a reader and/or encoder sensor positioned for reading and/or encoding a card in said card guide assembly.

2. The card mechanism of claim 1 wherein said reading and/or encoding sensor includes a magnetic stripe sensor.

3. The card mechanism of claim 1 wherein said reading and/or encoding sensor includes a micro chip sensor.

4. The card mechanism of claim 1 wherein said card guide assembly defines a generally linear guide path having a first end and a second end.

5. The card mechanism of claim 1 wherein said first drive system and said second drive system include motors having drive shafts coupled with respect to a common axis of rotation.

6. The card mechanism of claim 1 wherein said first drive system and said second drive system include motors having drive shafts extending co-linearly with respect to one another.

7. The card mechanism of claim 1 wherein said first drive system includes a stepper motor.

8. The card mechanism of claim 1 wherein said first drive system includes a solenoid.

9. The card mechanism of claim 1 wherein said second drive system includes a servo motor.

10. The card mechanism of claim 1 wherein said second drive system includes a drive roller sized to engage substantially the entire width of a card in said card guide assembly.

11. The card mechanism of claim 1 wherein said second drive system includes a drive roller and an opposing idler wheel biased against said drive roller.

12. The card mechanism of claim 11 wherein said drive roller includes one or more character relief areas.

13. The card mechanism of claim 2 wherein said reading and/or encoding sensor further include a micro chip sensor.

14. The card mechanism of claim 13 wherein said magnetic stripe sensor and said micro chip sensor are positioned at different locations on said card mechanism.

15. A motorized card reader/encoder mechanism, comprising:
- a moveable guide assembly having a card guide defining a generally linear card path for receiving and linearly transporting a card in said guide assembly;
- said guide assembly being moveable from a card transfer position wherein said guide assembly card guide is positioned to receive a card, to a card read/encode position; and
- a drive system for transporting a card in said guide assembly, and for moving said guide assembly between such transfer position and said read/encode position.

16. The card mechanism of claim 15 further including a sensor system for sensing a card in said guide assembly.

17. The card mechanism of claim 15 wherein said drive system includes a first drive for transporting a card in said guide assembly, and a second drive for moving said guide assembly.

18. The card mechanism of claim 17 wherein said first drive and said second drive have mutually aligned drive elements.

19. The card mechanism of claim 15 wherein said guide assembly and said drive system are further configured for movement of said guide assembly to a generally vertically oriented card retention position for directing a card to a card capture area.

20. A magnetic stripe and/or micro chip card motorized reader/encoder mechanism, comprising:
- a support chassis;
- a card guide assembly rotatably mounted on said support chassis, said card guide assembly defining a generally linear guide path having a first end and a second end;
- a throat assembly positioned adjacent said card guide assembly for receiving a card and directing it toward said card guide assembly;
- a first drive system operatively connected to rotate said card guide assembly relative to said support chassis between a card access position, a card read/encode position and a card retention position;
- a second drive system operatively connected to transport a card in said card guide assembly, said second drive system including a drive roller and an opposing idler wheel biased against said drive roller, said drive roller being substantially as wide as a card in said card guide assembly;
- said first drive system and said second drive system including motors having drive shafts coupled with respect to a common axis of rotation;
- a reader and/or encoder sensor positioned for reading and/or encoding a card in said card guide assembly;
- an access control system positioned adjacent said card guide assembly for limiting access to said card guide assembly;
- said access control system including a gate assembly having a slidable shutter configured for engagement with said card guide assembly, and said card guide assembly being configured to open said gate assembly when in said card access position; and
- a card sensor positioned adjacent said card guide assembly for sensing the presence of a card approaching said card guide assembly, said card sensor including a sensor head and an opposing idler wheel biased against said sensor.

* * * * *